Sept. 29, 1953            Z. BURRESON            2,653,480
TEMPERATURE INDICATOR FOR HAND PRESSING IRONS
Filed Sept. 3, 1948            2 Sheets-Sheet 2
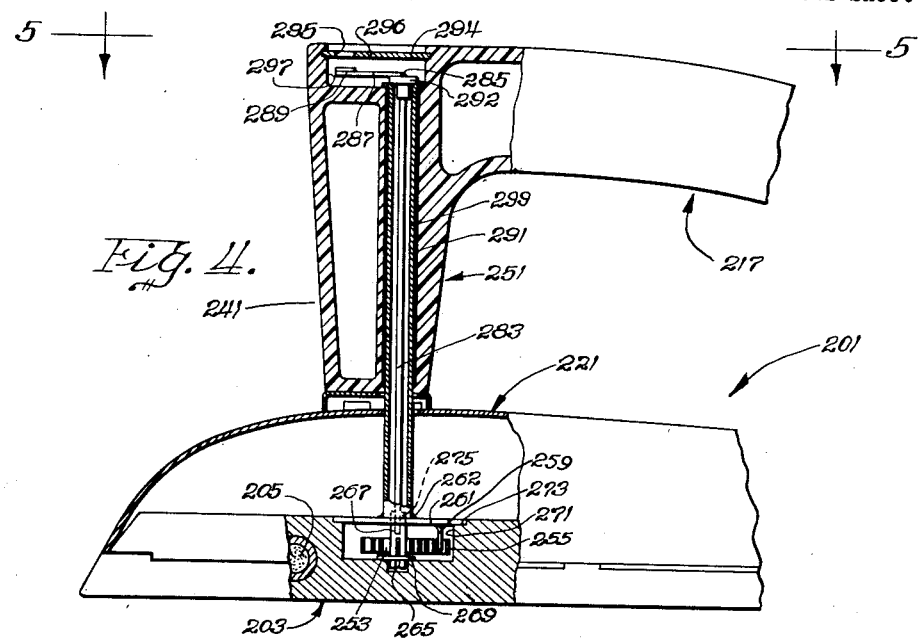
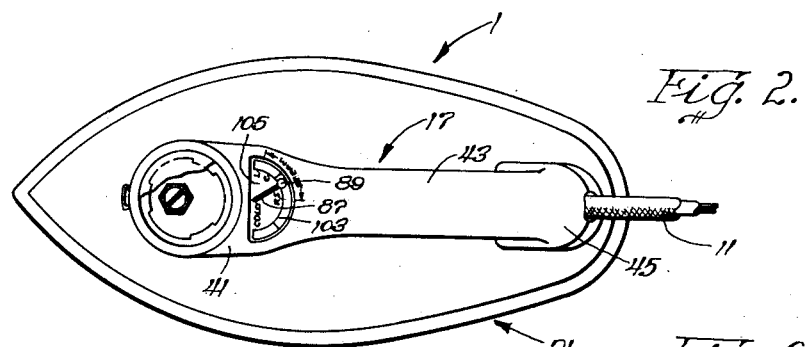
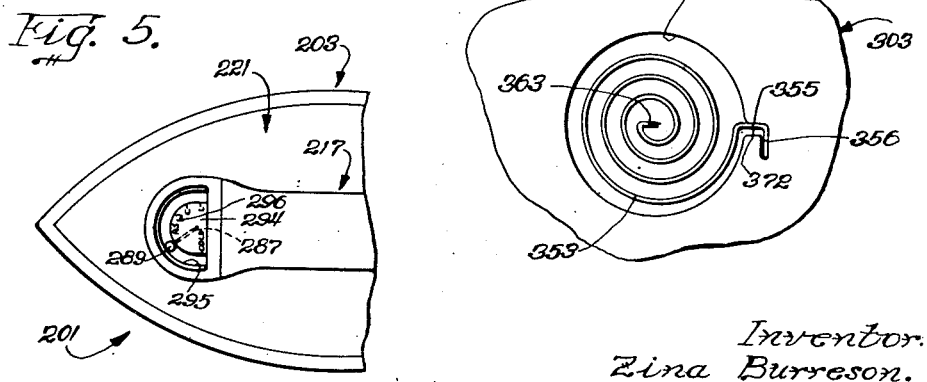
Inventor.
Zina Burreson.
By Brown, Jackson, Boettcher & Dienner,
attys Patented Sept. 29, 1953

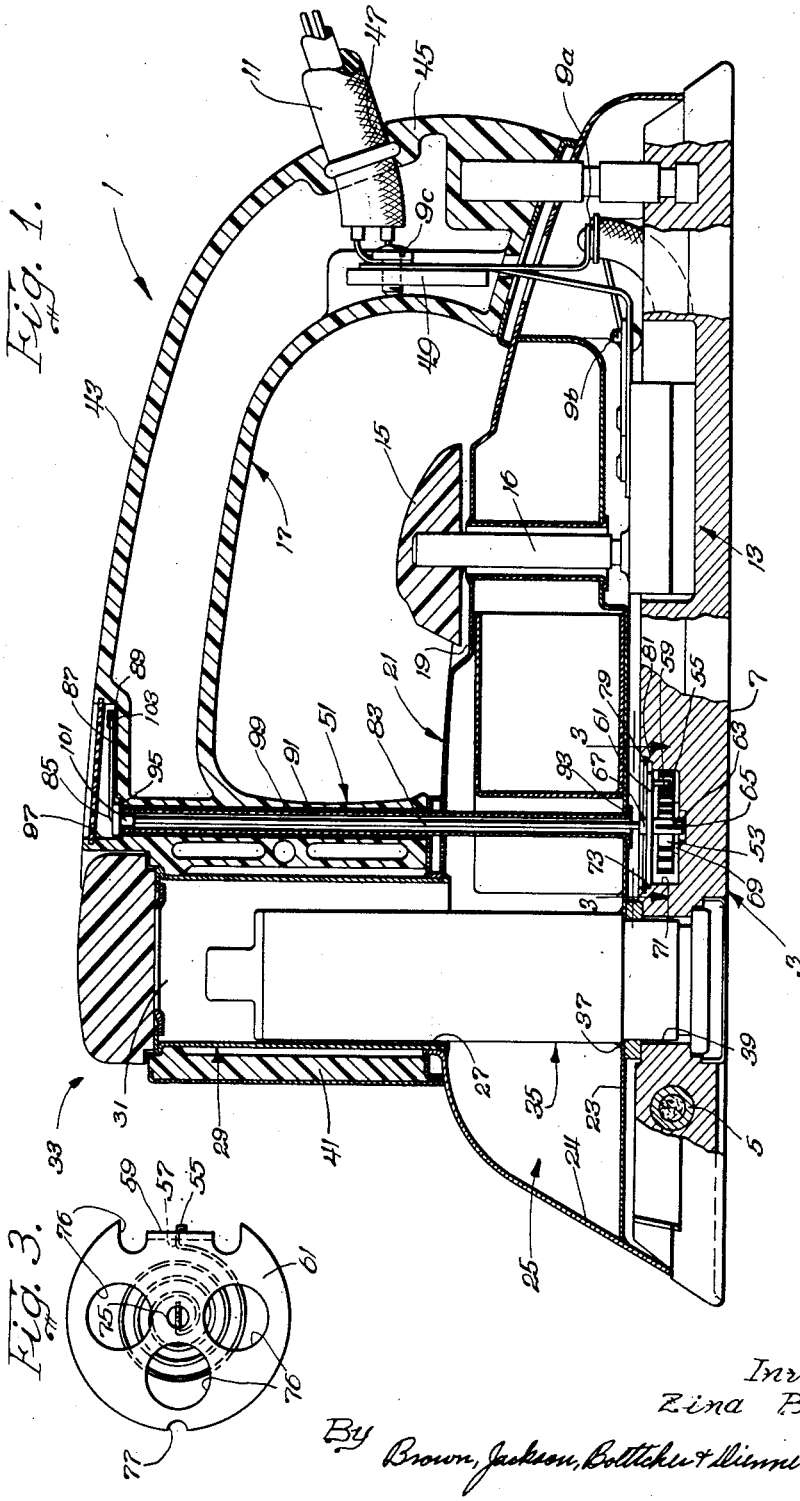

2,653,480

UNITED STATES PATENT OFFICE 2,653,480

TEMPERATURE INDICATOR FOR HAND PRESSING IRONS

Zina Burreson, Sheboygan, Wis., assignor to Presto Industries, Inc., Eau Claire, Wis., a corporation of Wisconsin Application September 3, 1948, Serial No. 47,707

10 Claims. (Cl. 73—343)

My invention relates generally to temperature indicating devices and more particularly to temperature indicators for hand pressing irons.

Most hand pressing irons which are available in the present market are electrically heated and are provided with a thermostatic control by which the temperature of the sole plate may be regulated. However, it will be readily apparent that movement of the handle or knob which actuates the thermostatic control from "off" position to a position corresponding to 400° F., for example, will not immediately cause the sole plate to attain a temperature of 400° F. and, consequently, any reading based solely on the dial of the thermostatic control will give an inaccurate knowledge of the temperature of the sole plate. It will take a while for the electric heating coil to heat the sole plate from room temperature to 400° F. and, in the meantime, the exact temperature of the sole plate will not be known. Furthermore, the user of the iron will not know when the 400° F. temperature has been reached, except as the user's experience may permit him to judge from the passage of time or from noises made by movement of elements in the thermostatic control. Such judgment, at best, is inaccurate and the results obtained are frequently unsatisfactory. Similarly, switching the thermostatic control from a higher temperature, such as 400 F., to a lower temperature leaves the user in doubt as to when the desired temperature has been obtained. Premature use of the iron on delicate materials which can be pressed only at lower temperatures may cause scorching or destruction of the material. Such difficulties as the foregoing are of course, greatly increased in hand pressing irons which are heated from external sources of heat or irons which are electrically heated but lack a thermostatic control.

To obviate such difficulties, temperature indicating devices for hand pressing irons have been proposed. Such devices have, in general, been unsatisfactory and to my knowledge no hand pressing irons presently on the market provide a device for indicating accurately the temperature of the sole plate of the iron. Some temperature indicators previously proposed have been substituted in electric irons for thermosatic controls. But the absence of such a thermostatic control leaves an iron which is unsatisfactory in performance, since there is then no control over the temperature of the sole plate except by disconnecting and connecting the iron from a source of electrical energy or other source of heat. Of those devices previously proposed substantially all have been so located as to be concealed from the view of the user of the iron when the iron is being employed for pressing material. Furthermore, many of such devices have been inaccurate because the heat responsive elements have been so located with respect to the sole plate that an accurate recording of the temperature of such plate is not possible. In other proposed devices the structure of the heat indicating means has been such that it was too expensive to manufacture either because of the labor involved in assembling the device or the cost and number of parts involved, or for other reasons.

It is an object of my invention to provide a temperature indicating device which will accurately reveal the temperature of the sole plate at all times. In this connection I prefer to locate the means responsive to changes in temperature of the sole plate directly in the sole plate.

It is another object of my invention to provide a temperature indicating device which is visible to the user of the iron even when the iron is being engaged by the hand of the user during pressing operations. In a preferred form of the invention, the temperature indicating device is positioned in a recess in the top of the handle of the iron directly in front of the position which the hand takes in manipulating the iron.

It is a further object of the invention to provide a temperature indicating device of relatively few and simple parts so that the cost of the parts and the labor costs in assembling the parts are greatly reduced. In this connection I frequently make one part serve the purpose of several parts previously required in constructing temperature indicating devices.

A further advantage of the temperature indicator of this invention is that it may be employed in various forms of hand pressing irons whether they be heated by self-contained heating means such as gas burners or electrical resistance elements, or by external sources of heat.

It is yet another object of this invention to incorporate in a hand pressing iron which includes steam generating mechanism a temperature indicating device which is adapted to have a portion of the device pass through said mechanism but be out of contact with any steam which is generated. With such a device it is possible to have the steam generating mechanism located in the iron wherever desired or wherever found to be most advantageous.

Further objects, uses and advantages of the invention will become apparent or be obvious from a consideration of the description and drawings, in which drawings:

Figure 1 is a vertical, sectional view of a steam iron embodying the temperature indicating device of my invention, some portions of the iron being shown in elevation;

Figure 2 is a plan view, on reduced scale, of the steam iron illustrated in Figure 1;

Figure 3 is an enlarged plan view looking in the direction of the arrows 3—3 of Figure 1, of a portion of the temperature indicating device of Figure 1;

Figure 4 is a fragmentary view, partially in section and partially in elevation, of a hand pressing iron embodying the temperature indicating device of my invention;

Figure 5 is a fragmentary plan view of the iron and temperature indicating device of Figure 4; and Figure 6 is a fragmentary plan view of a modified form of sole plate and heat responsive mechanism associated therewith.

Referring now to Figures 1, 2 and 3 there will be seen a hand pressing iron, indicated generally by the reference numeral 1, which has a sole plate indicated by the reference numeral 3. The sole plate is heated by an electric resistance unit or heating element 5 and has a pressing face 7. It will be understood, of course, that the heating element 5 may take any one of a number of known forms of electrical heating elements, or the iron may be heated by gas jets or by being periodically associated with a source of heat external to the iron. The heating element 5 is electrically connected through terminals 9a, 9b and 9c with an electric cord 11 which is adapted to be connected to a source of electrical energy, such as an electrical wall outlet (not shown). In series with the heating element 7 is a thermostatic control, indicated generally by the reference numeral 13, which may be manually controlled by means of the control knob 15 on the exterior of the iron beneath the handle 17, and by the connecting shaft 16. By means of the control knob 15 the user of the iron may select the temperature to which the sole plate 3 is to be heated and the thermostatic control 13 then automatically permits the sole plate to attain that temperature and maintains it at the selected temperature during the ironing operation. A dial face 19 having a scale may be associated with the control knob 15 of the thermostatic control 13, said dial face being located on the upper surface of the casing which is indicated generally by the reference numeral 21.

The casing 21 has an inner bottom wall 23 which is welded to the upper portion 24 of the casing in water tight relation to define a boiler 25. The boiler 25 is adapted to hold water which will be converted to steam and eventually be discharged at the face 7 of the sole plate 3. Secured in an aperture 27 at the upper portion 24 of the casing 21 is a steam dome and filler tube 29 which is positioned at the front end of the iron 1. At the top of the steam dome 29 there is an opening 31 having a closure member 33 which is adapted to seal the opening 31 so that steam under pressure may exist within the steam dome 29. The closure element or cap 33 is removable so that a conveniently large inlet is provided for supplying the boiler 25 with water. In the preferred form the boiler 25 and dome 29 are constructed of sheet metal stampings secured together as by welding.

A vertically extending chamber 35 is secured in water tight relation, as by welding at 37, to the bottom wall 23 of the casing 21 and the chamber extends upwardly through the boiler 25 and into the steam dome 29. The chamber 35 also extends downwardly through an aperture 39 in the sole plate 3. The chamber 35 is adapted to provide a passageway for the flow of steam from the steam dome 29 to the face of the sole plate 7. For a complete understanding of the construction and operation of the chamber 35 reference may be had to the copending application of Henry Maykemper, Serial No. 785,897 filed November 14, 1947. The chamber 35 and its associated mechanism serves to secure the casing 21 and its boiler 25 to the sole plate 3 as is more fully set forth in the aforementioned application Serial 785,897.

The handle 17 is secured to the upper surface of casing 21 and has a forward vertically extending tubular portion 41 which is adapted to encircle the steam dome and filler tube 29. The forward tubular portion 41 is integrally formed with the hand grip portion 43, said hand grip portion having a rear portion 45 which extends downwardly for connection with the casing 21 of the iron 1. The handle 17 is hollow and has an aperture 47 through which the electric cord 11 extends so that it may be connected with the terminal plate 49. The handle is formed of a material which is a poor heat conductor and its connection with the remainder of the iron is such as to reduce to a minimum the intercontacting surfaces of the casing 21 and handle 17.

Referring more particularly now to the temperature indicating means or device, which is indicated generally by the reference numeral 51, there will be seen a heat responsive element 53 comprising a bi-metallic, spirally-wound strip which has its outer end 55 fixed in a slot 57 of a downwardly turned tongue 59 of a plate or disc 61. The other, or inner, end of the coiled bi-metallic heat responsive means 53 is secured in a slot 65 of a sleeve 67. A washer 69 surrounds the lower end of the sleeve 67 and is positioned beneath the bi-metallic member 53 to act as a thrust bearing of small area to obtain smooth rotary movement of coil 53.

The bi-metallic heat responsive means 53 is positioned in a well 71 which extends downwardly from the top surface of the sole plate 3. The plate or disc 61 is adapted to be seated on a shoulder 73 of the well 71 and said plate has a passageway or aperture 75 which is adapted to act as a bearing and a guide for the sleeve 67 which is connected to the inner end of the heat responsive means 53. It will be seen that plate 61 has a number of other openings 76 and has an integral downwardly turned tongue 59 in the slot 57 of which the outer end of the heat responsive means 53 is positioned. Said tongue therefore serves as a reaction member for the heat responsive means 53. There is provided on the periphery of plate 61 an indentation 77 which is adapted to engage a portion of the sole plate 3 to prevent rotation of the plate 61 in response to movement of the heat responsive means 53. A split spring washer 79 is adapted to be seated in a recess 81 in the well 71 immediately above the plate 61 in order to restrain said plate from leaving shoulder 73.

Pressed into the sleeve 67 is a rigid connecting member comprising a vertically extending wire 83 which is bent at its upper end, as at 85, to form a pointer 87, and is knurled at its lower end for fixed connection with sleeve 67. The head 89 of pointer 87 may be colored for greater visibility. In order for the connecting member 83 to pass through the boiler 25 without being contacted by steam or water there is provided a vertically extending tube 91 surrounding the connecting member 83. The tube 91 has a lower flange 93 connected with the under side of the bottom wall 23 of casing 21 and has an upper flange 95 seating in a recess 97 in the top of the handle 17 at a position just in front of the position the hand of the user will assume in manipulating the iron. Tube 91, in addition to passing through the boiler 25 in fluid-tight relation thereto, extends vertically through a passageway 99 in the forward portion of the handle 17 and into the recess 97 in the top of the handle 17. At its lower end connecting member 83 is secured to sleeve 67, so that there is no relative rotation between them, and at its upper end where it is bent, as at 85, member 83 is carried in a bearing member 101 which provides a vertically extending bearing for the connecting member 83. On the bottom of the recess 97 is disposed a dial face 103. It will be understood that the dial face might be disposed on the under side or the top side of the window 105 which is preferably formed of a transparent plastic material. As will be observed from Figures 4 and 5, a metal plate, having a window through which a pointer is visible, may bear the dial face.

In use, the operator will turn the thermostatic control knob 15 to a position corresponding to the approximate desired temperature. The operator will be able to see from the pointer 87 and the scale of dial face 103 the actual temperature of the sole plate of the iron. The scale of dial face 103, as shown in Figure 2, is calibrated according to the materials which are to be ironed instead of directly in degrees of temperature Fahrenheit. Preferably the scale of the dial face 19, which is associated with the control knob 15 of the thermostatic control 13, will bear the designations "Off," "Low," "Medium," and "High." When the desired temperature of the iron is reached, as indicated by the pointer and dial face of the temperature indicating device 51, the operator may employ the iron and at all times the temperature of the sole plate will be clearly visible to the operator, since the pointer 87 and dial face 103 of the temperature indicating device will be located in front of the position in which the operator's hand will be placed for manipulating the iron. Even when the temperature of the sole plate is changed by manipulation of the thermoplastic control 13 by its control knob 15, the operator will have an exact indication, moment by moment, of the temperature of the sole plate by reference to the temperature indicating device 51.

In Figures 4 and 5 there is shown, fragmentarily, a hand pressing iron 201 having a sole plate 203 and a casing 221 but no steam generating mechanism such as that illustrated in the iron in Figures 1 and 2. The temperature indicating device, indicated generally by the reference numeral 251, has a heat responsive means 253 comprising a bi-metallic spirally-wound strip, the outer end 255 of which is secured in a slot (not shown, but similar to the slot 57 in Figure 1) of a tongue 259 downwardly turned from a plate or disc 261. The plate 261 is similar to the plate 61 of Figures 1 and 2, and has a central aperture 275 which forms a bearing or guide for the sleeve 267 which has a slot 265 in its lower end. In slot 265 is secured the other, or inner, end of the heat responsive means 253. A washer 269 is disposed beneath the heat responsive means 253 and surrounds the sleeve 267. Heat responsive means 253 is disposed in a well 271 extending downwardly from the top surface of the sole plate 203. A shoulder 273 surrounding the well 271 provides a seat for the plate or disc 261 and said plate is adapted to be secured against rotation relative to the sole plate 203 as by welding, or by peening a portion of the adjacent sole plate into engagement with the edge of the plate 261. A rigid connecting member 283 is connected at its lower end with the sleeve 267 and member 283 extends upwardly through tube 291 and through a bearing 292, which rests upon the upper end of the tube 291. Member 283 is bent at an angle, as at 285, to provide a pointer 287 at its free end. The tip 289 of the pointer 287 may be colored in order to render it more easily visible. The lower end of the tubular shaft 291 may be secured to the plate 261, as by welding at 262. The tube 291 extends vertically upwardly through a passageway 299 in the forward portion 241 of the handle 217 and is flanged into a recess 297 in the top of the handle 217 at its forward end. A metal plate 294 having a curved slot 295 closes off the recess and prevents contact with the pointer 287. The curved slot 295 is adapted to reveal the colored end 289 of pointer 287 wherever said pointer may be moved by the heat responsive means 253. A dial face 296, having a scale or code, is disposed on the top surface of the metal plate 294 along the edge of the slot 295. The dial face 296 may be calibrated to show either the temperature in degrees Fahrenheit, if desired, or may, as shown in Figure 5, indicate the materials which may be ironed at different temperatures. It will be appreciated that a dial face might be placed inside of the recess 297 beneath the slot 295 and that the movement of the pointer 287 thereover would indicate the temperature of the sole plate or the materials which may properly be ironed at different temperatures.

In Figure 6 there is shown by a fragmentary view another manner in which the heat responsive means 53 of Figure 1, or means 253 of Figure 4, may be held at one end against movement relative to a sole plate 303 which is similar to the sole plates 3 and 203. Assuming that the numeral 303 represents the sole plate viewed from above and that there is a well 371 therein, it will be seen that the heat responsive means —comprising a bi-metallic spirally-wound strip 353 which is adapted to move in response to changes in temperature of the sole plate 303— has its outer end 355 formed in a generally L-shape. Said end is adapted to be pressed into the L-shaped passageway 372 which communicates with the well 371. End 355 of the heat responsive means 353 has the straight portion 356 frictionally engaged at its opposite ends in the passageway 372, and, as the temperature of the sole plate 303 changes, the heat responsive means 353 will tend to wind or unwind and its inner end 363 will tend to rotate while the end 355 will be held against movement. It will be understood, of course, that the end 355 of the heat responsive means 353 could be welded in place within the passageway 372 in the sole plate 303, or could be secured therein by a peening operation. It will also be understood that the passageway 372 and end 355 could assume other cooperating shapes.

While I have illustrated preferred embodiments of the invention, it will be understood that variations and changes may be made by those skilled in the art, in view of my disclosure and that I do not intend to be limited to the illustrated forms, except insofar as the appended claims are limited.

I claim:

1. A device adapted to indicate the temperature of the sole plate of a pressing iron which has a handle for manipulating the iron and a boiler, said device comprising, in combination, means adapted to move in response to variations in the temperature of the sole plate, temperature indicating means adapted to be carried by the iron at a location forward of the position of the user's hand when manipulating the iron by its handle, said temperature indicating means including a movable element, a connecting member between the movable element of the temperature indicating means and said movable means, said connecting member being adapted to extend through the boiler of the iron, and a conduit surrounding the connecting member where it passes through the boiler, said conduit being adapted to keep the connecting member out of contact with the contents of the boiler.

2. A sole plate for a pressing iron having a well in its top surface in which a thermostatic element having a crooked end is adapted to be positioned and an angled passageway communicating with said well and adapted to have the crooked end of the thermostatic element held therein.

3. In a pressing iron, in combination, a sole plate, a handle for manipulating the iron and its sole plate, a steam chamber disposed between the sole plate and handle, a fluid-proof conduit extending downwrdly through the steam chamber, heat responsive means disposed between the steam chamber and the sole plate and movable in response to changes in the temperature of the sole plate, and temperature indicating means disposed adjacent the top surface of the handle at the forward end thereof, said temperature indicating means including a movable member which is connected with the heat responsive means through said conduit.

4. The combination of claim 3 wherein the handle includes a recess in the top surface of the iron in front of that portion of the handle which is gripped by the hand of the user and which handle includes downwardly extending front and rear portions; the movable member of the temperature indicating means includes a pointer disposed in said recess and connected by means of a vertically extending shaft with the heat responsive means; and the conduit extends downwardly from said recess through the front portion of the handle and provides at its upper end a bearing for the vertically extending shaft and for the pointer.

5. In a pressing iron, in combination, a sole plate having a well in the top thereof, a handle for manipulating the iron and its sole plate, there being a recess in the top surface of the handle forward of that portion of the handle which will be gripped by the user, a tubular conduit having a flanged end which is adapted to rest in said recess, said conduit extending vertically downwardly from the recess to a position adjacent the well in the sole plate, temperature indicating means in said recess including a scale and a movable pointer, a thermostatic element positioned in said well, a plate fixed with respect to the well and having a tongue turned out of the plane of said plate to form a reaction member for one end of the thermostatic element, said plate being apertured to provide a bearing, and a rotatable shaft connected at one end to the free end of the thermostatic element and extending upwardly through the bearing in said plate and through the conduit and being connected at its upper end with the movable pointer.

6. In a pressing iron, in combination, a sole plate having a well in the top thereof, a handle for manipulating the iron and its sole plate, heat responsive means in said well closely adjacent the pressing face of the sole plate, said heat responsive means being movable in response to variations in the temperature of the pressing face of the sole plate, temperature indicating means carried in a recess in the top surface of the handle at a location forward of the position of the user's hand when the user is manipulating the iron by its handle, and straight connecting means connecting the heat responsive means and the temperature indicating means, said connecting means extending directly downwardly from said recess in the handle to said well.

7. The combination of claim 6 wherein the temperature indicating means comprises a scale member and a pointer member, and said pointer comprises a bent end of said straight connecting means.

8. In a pressing iron, in combination, a sole plate having a well in the top thereof, a handle for manipulating the iron and its sole plate, heat responsive means in said well closely adjacent the pressing face of the sole plate, said heat responsive means being movable in response to variations in the temperature of the pressing face of the sole plate, temperature indicating means carried in a recess in the top surface of the handle at a location forward of the position of the user's hand when the user is manipulating the iron by its handle, said temperature indicating means including a movable pointer, straight connecting means connected at its upper end with the movable pointer and at its lower end with the heat responsive means, and a tubular member having its upper end carried in the recess of the handle of the iron and providing bearing means for said straight connecting means and said pointer.

9. The combination of claim 8 wherein the the handle has an integral vertically extending portion which includes a vertical passageway which surrounds said tubular member and which opens into the recess in the top surface of the handle.

10. In a pressing iron, in combination, a sole plate having a pressing face, a handle for manipulating the iron and its sole plate, heat responsive means positioned closely above the sole plate to obtain an indication of the temperature at the pressing face, said heat responsive means being movable in response to variations in a temperature of the sole plate, temperature indicating means carried in a recess in the top surface of the handle at a location forward of the position of the user's hand when the user is manipulating the iron by its handle, and substantially rigid, straight connecting means connecting the heat responsive means and the temperature indicating means, said connecting means extending downwardly from said recess in the handle to the heat responsive means.

ZINA BURRESON.

References Cited in the file of this patent

UNITED STATES PATENTS

| Number | Name | Date |
|---|---|---|
| 1,441,363 | Manns | Jan. 9, 1923 |
| 1,491,580 | Bognar | Apr. 22, 1924 |
| 1,581,812 | Ryan et al. | Apr. 20, 1926 |
| 1,708,048 | Brewer | Apr. 9, 1929 |
| 2,152,502 | Schmidt et al. | Mar. 28, 1939 |
| 2,194,845 | Braun | Mar. 26, 1940 |
| 2,201,745 | Sparklin | May 21, 1940 |
| 2,300,230 | Kuhn et al. | Oct. 27, 1942 |
| 2,593,194 | Rollman | Apr. 15, 1952 |